Aug. 18, 1959 F. L. PARSONS 2,900,210
GROUND TRACTION UNIT
Filed Aug. 11, 1958 5 Sheets-Sheet 1

INVENTOR.
FREDERICK L. PARSONS
BY
Moses, Nolte + Nolte
ATTORNEYS

Aug. 18, 1959     F. L. PARSONS     2,900,210
GROUND TRACTION UNIT

Filed Aug. 11, 1958     5 Sheets-Sheet 2

INVENTOR.
FREDERICK L. PARSONS
BY
Moses, Nolte & Nolte
ATTORNEYS

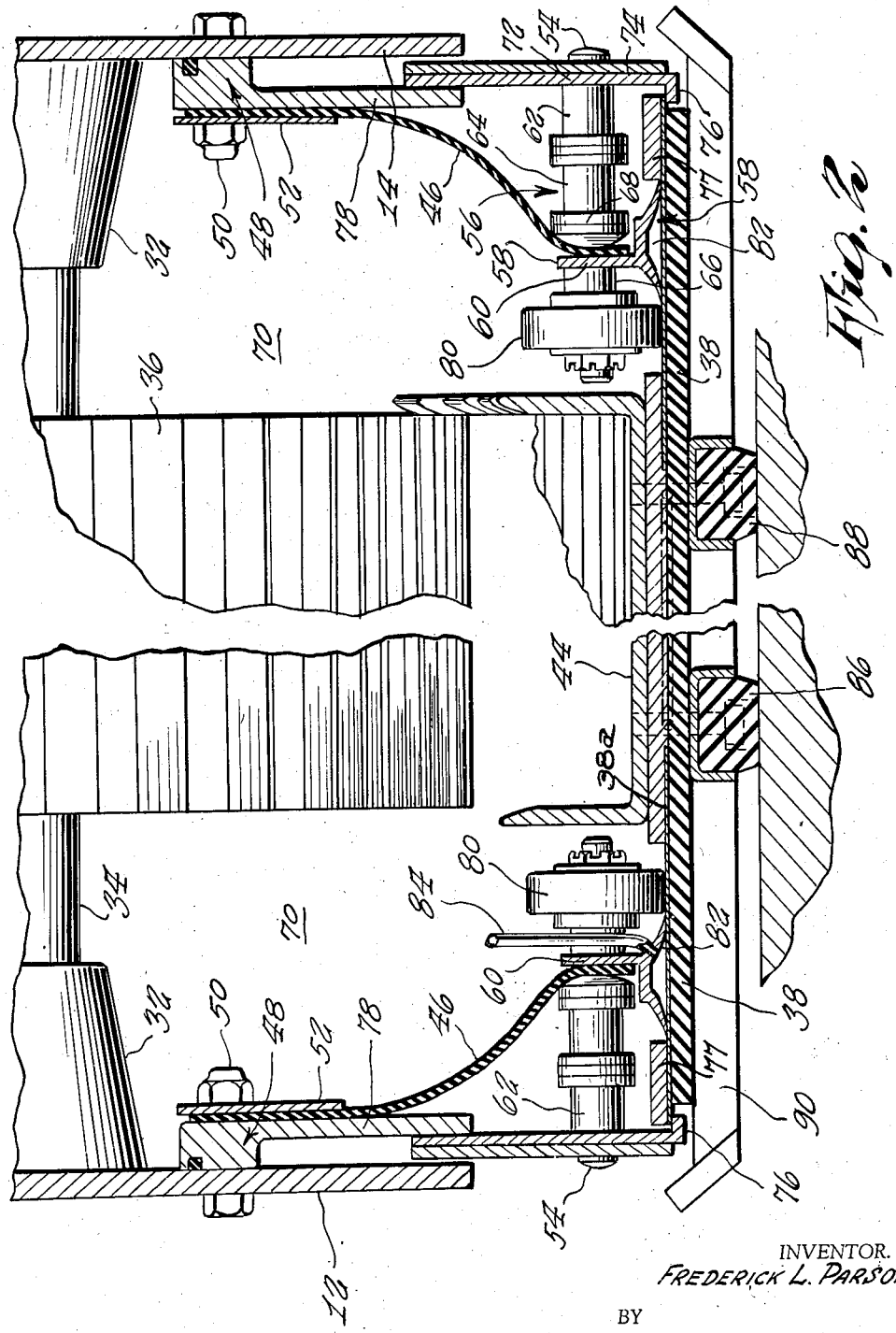

Aug. 18, 1959   F. L. PARSONS   2,900,210
GROUND TRACTION UNIT
Filed Aug. 11, 1958   5 Sheets-Sheet 4
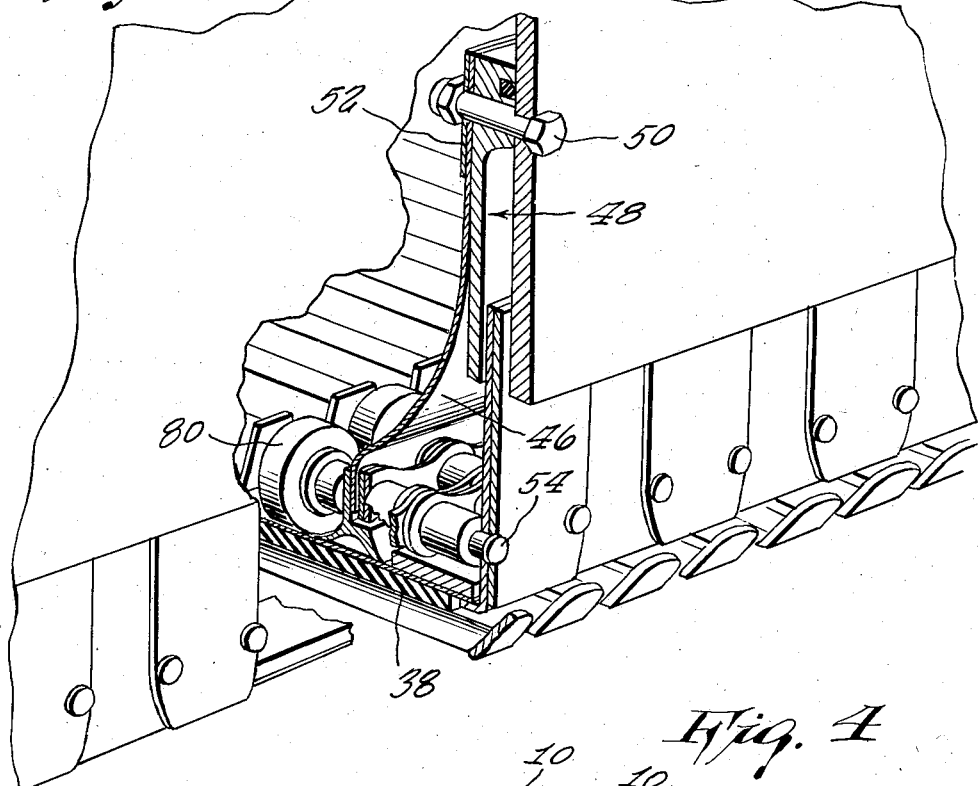
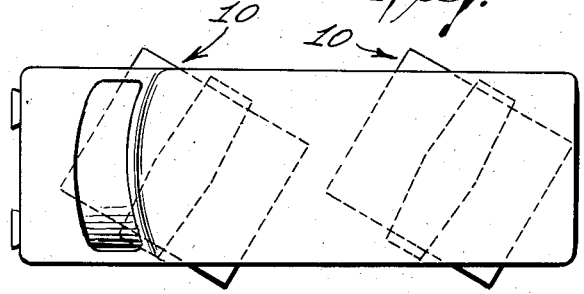
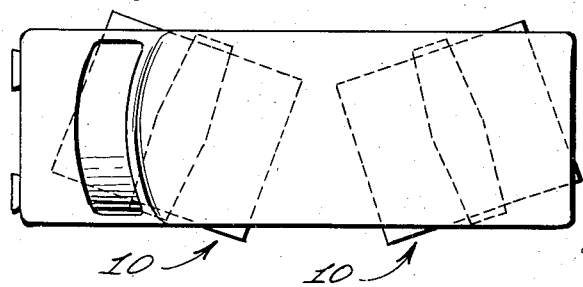
INVENTOR.
FREDERICK L. PARSONS
BY
Moses, Nolte + Nolte
ATTORNEYS Aug. 18, 1959  F. L. PARSONS  2,900,210
GROUND TRACTION UNIT
Filed Aug. 11, 1958  5 Sheets-Sheet 5
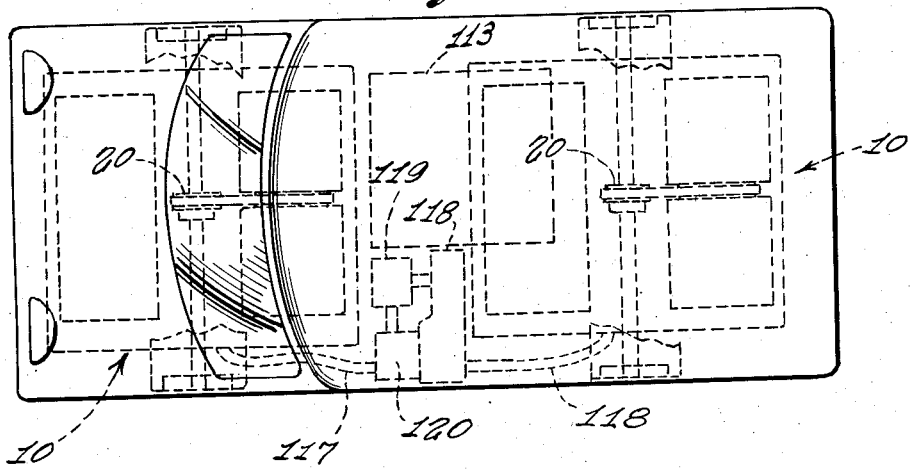
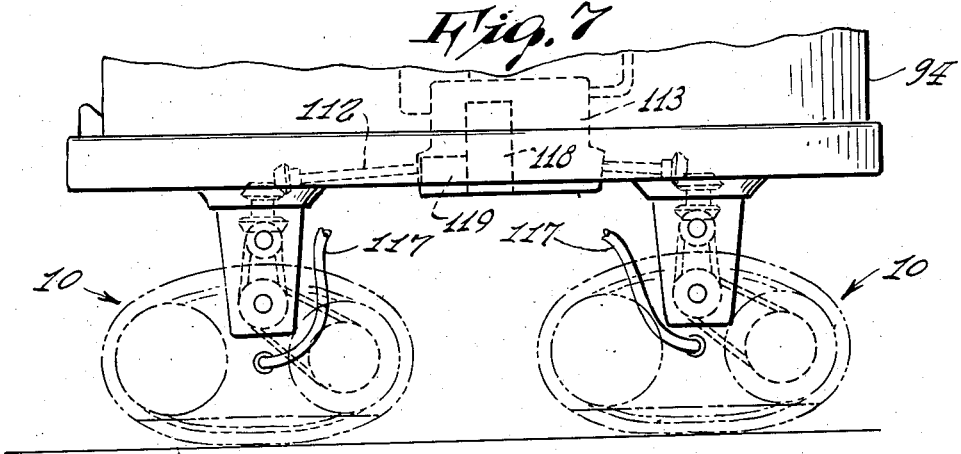
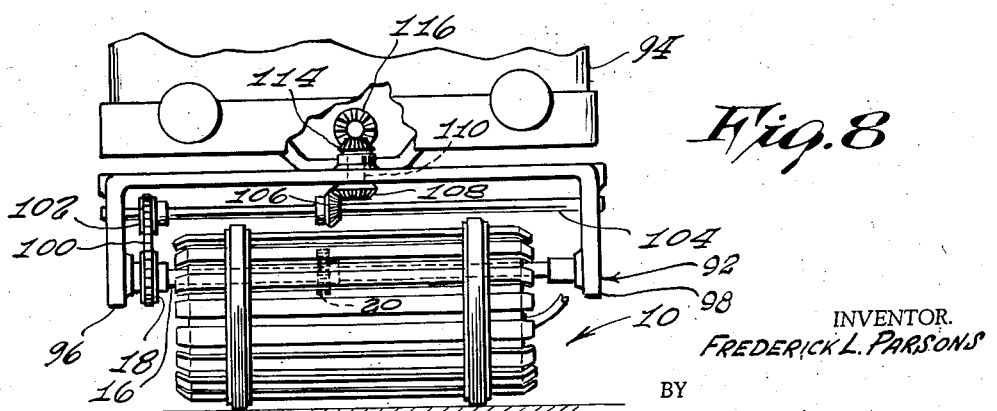
INVENTOR.
FREDERICK L. PARSONS
BY
Moses, Nolte & Nolte
ATTORNEYS United States Patent Office 2,900,210
Patented Aug. 18, 1959

2,900,210

GROUND TRACTION UNIT

Frederick L. Parsons, Ridgewood, N.J.

Application August 11, 1958, Serial No. 754,487

16 Claims. (Cl. 305—2)

This invention relates in general to traction or trailing units for ground vehicles and particularly to a new and useful pneumatic supported tread or endless belt type traction unit.

The present invention finds particular application as a traction unit for a vehicle which is to be used in extreme operating conditions over all types of terrain and in all climatic conditions. Presently, with vehicles of this type it is customary to use either a crawler track which is more or less rigidly supported, or large pneumatic tires maintained at low pressure to afford traction in sandy, muddy or icy terrain. A disadvantage in the crawler track type of construction is that it is not sufficiently resilient to easily accommodate all types of terrain, and in cases where spring biased sections of track are included, they are difficult to maintain in proper lubrication and working order. In those instances where large, low pressure tires are used resort must be made to extremely large diameters in order to get an equivalent large surface of the tire in contact with the ground for weight distribution and traction purposes.

In accordance with the present invention there is provided a pneumatically suspended tread track unit suitable for use over all types of terrain and in all types of climatic conditions. The invention includes means for rotating an endless belt tread track around two spacing rollers, one or both of which is power driven. The tread track is supported by an internal pressure and sealed by resilient sealing walls including a circumferentially extending air sealing lip held in engagement with the marginal edges of the tread track by air pressure and an aligning and driving cog assembly.

A feature of the invention is that the tread is maintained, by internal air pressure, in contact with the ground at a level much lower than the bottom portions of the spacer rollers about which the track revolves. The elevated positioning of the spacer roller reduces the likelihood of contact and damage to the rollers when the tread traverses unusually sharp and abutting objects on the ground. Since the track requires very little air to keep it under pneumatic suspension, this small amount of air can be either cooled or heated very easily to maintain the parts at proper operating temperatures when they are exposed to extreme climatic conditions.

Accordingly it is an object of this invention to provide an improved traction unit.

A further object of this invention is to provide a pneumatically suspended endless tread belt type of traction unit for land locomotion.

A further object of the invention is to provide a traction unit which is simple in design, rugged in construction, light in weight and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

Fig. 2 is a fragmentary vertical section taken on the line 2—2 of Figs. 1a and 1b;

Fig. 3 is an enlarged perspective view similar to Figs. 1a and 1b and indicating the pneumatic seal and the guiding cog and spacer roller mechanism;

Fig. 4 is a top plan view of a vehicle having two traction units turned in a direction to propel the vehicle in a direction oblique to its forward and rear axis;

Fig. 5 is a view similar to Fig. 4 but indicating the traction unit turned to a position for effecting a right hand turn of the vehicle;

Fig. 6 is a top plan view of a vehicle having two traction units constructed in accordance with this invention;

Fig. 7 is a side elevation of the vehicle shown in Fig. 6 and indicating one arrangement for the suspension and drive of a traction unit constructed in accordance with the invention; and Fig. 8 is a fragmentary end elevation partly in section of the vehicle indicated in Fig. 6.

Figure 1A:
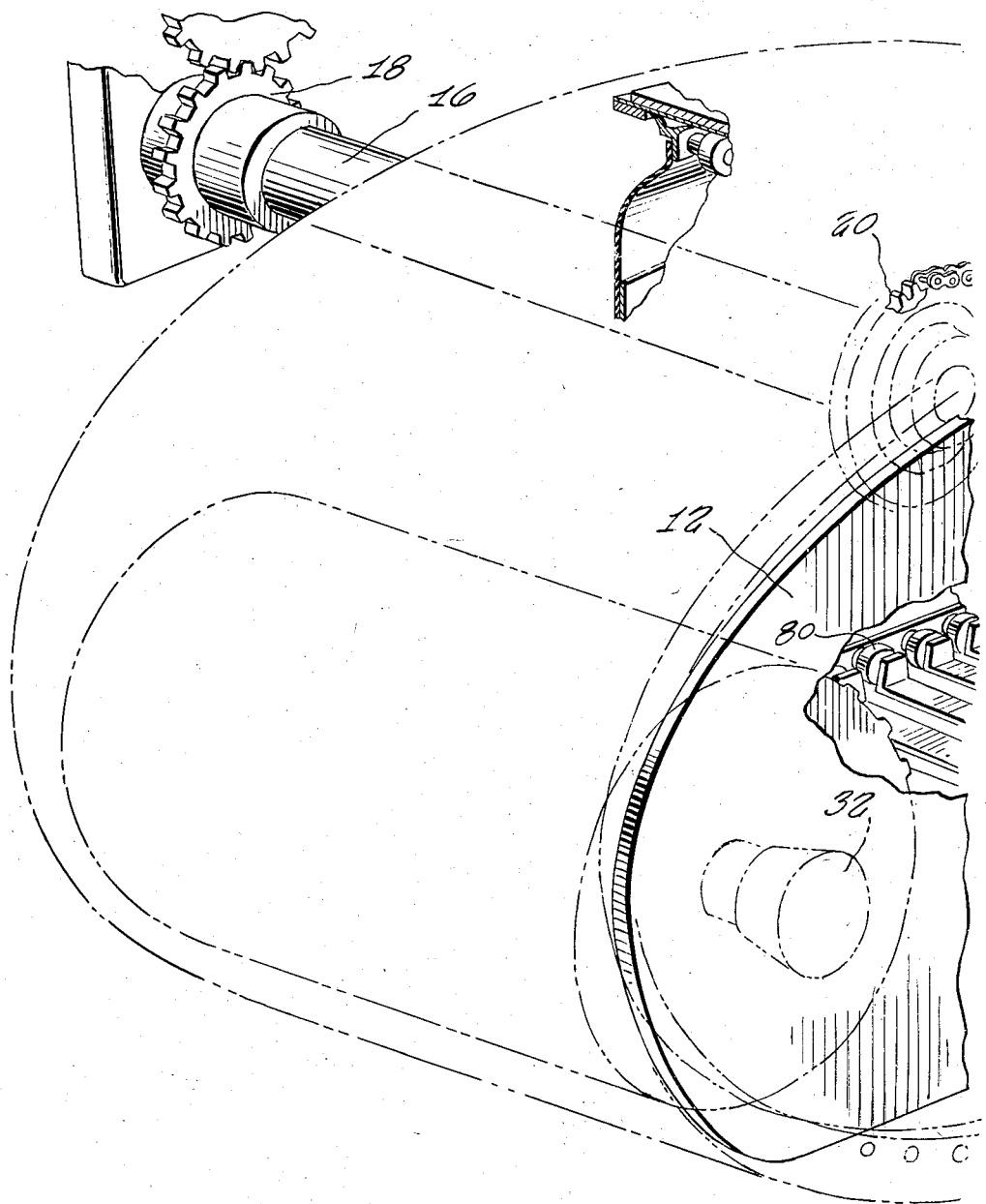
Figs. 1a and 1b are complementary portions of a perspective view of a traction or trailing unit constructed in accordance with this invention.
Figure 1B:
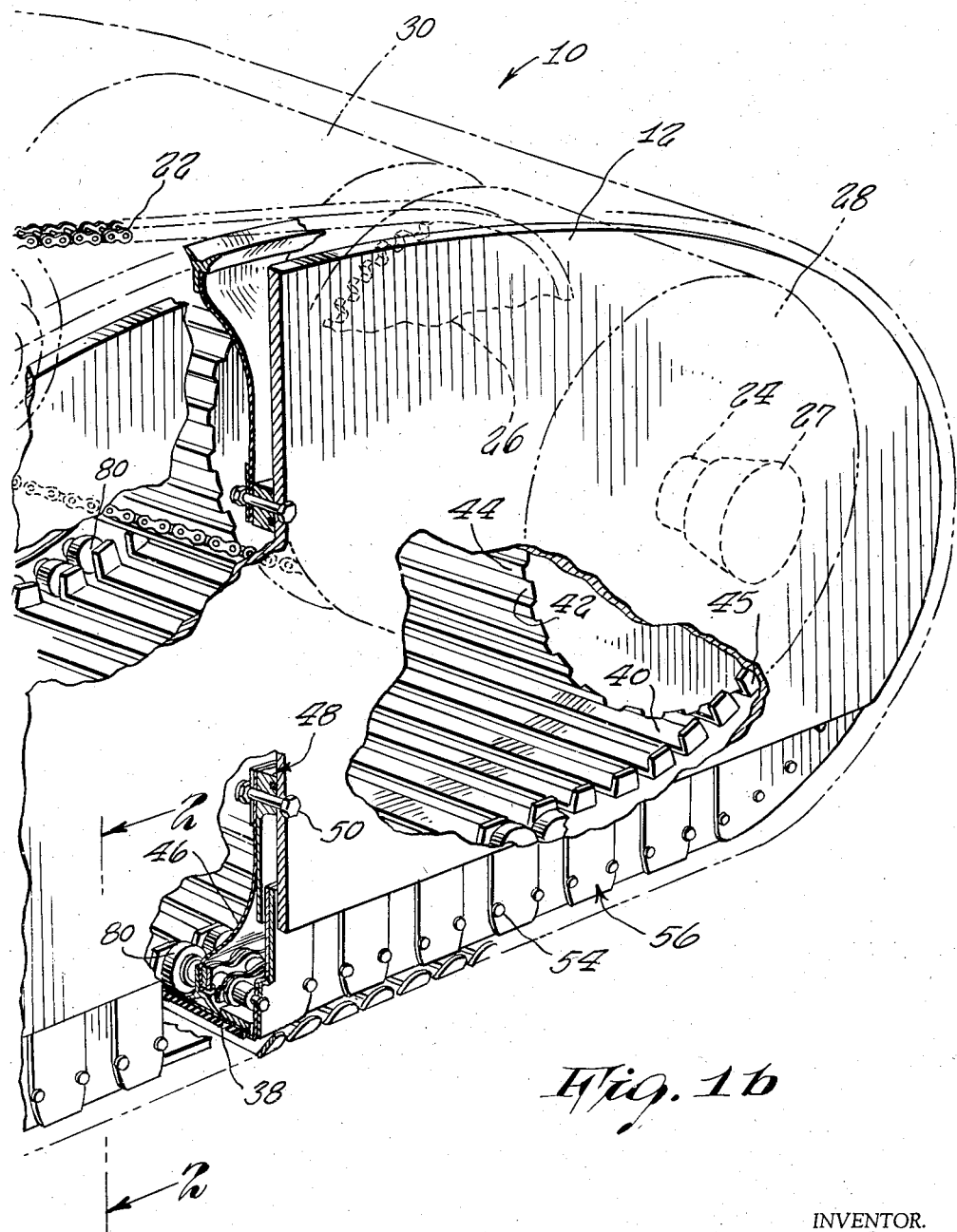

Referring to the drawings in particular the invention as embodied therein includes a traction unit or pod generally designated 10. The pod 10 includes two spaced substantially elliptical side plates 12 and 14 (Figs. 1a, 1b and Fig. 2) which are held in spaced relationship by suitable reinforcing cross members (not shown).

Rotatably mounted in suitable bearings in the plates 12 and 14 is a main drive shaft 16. The drive shaft 16 is provided with a driving sprocket wheel 18 adjacent one end thereof which receives power from a suitable source to rotate mechanisms in the pod, to be described more fully hereinafter. Mounted intermediate the drive shaft 16 is a sprocket wheel 20 on which is positioned a drive sprocket chain 22 arranged to transmit power from the shaft 16 to a shaft 24 having a centrally located sprocket 26 affixed thereon and upon which is positioned the chain 22.

The shaft 24 is rotatably mounted in bearings 27 affixed to each of the plates 12 and 14. Affixed to the shaft 24 on each side of the sprocket 26 is a pair of spacer rollers 28 and 30. It should be appreciated that where sprocket 26 is located near the end of the shaft 24 only one sprocket drum will be used. Rotatably mounted in bearings 32 at the other end of each of the plates 12 and 14 is a shaft 34 on which is affixed a spacer roller 36 which is laterally elongated and coextensive in width with the two drums 30 and 28 combined.

In accordance with the invention an endless tread 38 of flexible material such as rubber or the like is provided with a plurality of uniformly spaced driving cogs 40 affixed to the inner surface thereof. The endless belt 38 extends around each of the two spacer rollers 28 and 30, at one end, and the spacer roller 36 at the opposite end of the pod 10, and the driving teeth 40 engage recessed portions 42 located between teeth 44 on the drums 28, 30 and 36. The ends of the driving teeth 40 on the belt 38 are turned upwardly as at 45 beyond the sides of the drums.

A resilient member 46 made of high strength rubber or the like and of the general configuration of a flattened doughnut is affixed along its inner periphery to L-shaped spacing blocks generally designated 48, secured to the elliptical plates 12 and 14 as by bolts 50. A plate 52 is bolted over the resilient member 46 in order to insure an air tight seal at this location.

The opposite end of the resilient member is provided with a plurality of openings through which individual bolts 54 of an endless chain assembly generally designated 56 are positioned. An endless air seal member generally designated 58 includes a perpendicular portion 60 which is positioned adjacent the resilient member 46 and through which the bolt 54 extends.

The chain (non-rotating) assembly 56 includes sleeve spacer elements 62, 64 and 66 and a beveled member 68. The resilient member 46 and the perpendicular portion of the seal member 58 sealed together and further wedged tightly together by the beveled member 68 and the sleeve 66.

The outer peripheral portion of the air seal member 58 is substantially V-shaped and is urged against the endless belt 38 by air pressure provided in an interior compartment designated 70. The endless chain assembly 56 is pivotally secured at its outboard end to an inner L-shaped plate 72 and to an outer small plate 74. A lip 76 of the L-shaped plate 72 extends around a marginal reinforcing member 77 which is secured to the endless belt 38.

The plates 72 and 74 are confined within a slot formed by the outside elliptical plates 12 and 14 and by a wall 78 of each spacer block 48. The arrangement is such that the L-shaped plate 72 keeps the seal member 58 from jumping out of contact with the endless belt 38, and in addition acts as an armor plate to protect the rubber diaphragm and prevent its puncture.

In accordance with the invention the air seal member 58 is guided for correct association with the resilient endless belt 38 by rollers 80 affixed to the bolts 54 of the endless chain assembly 56. The rollers 80 are closely spaced from an annular V-shaped portion 82 of the air seal member 58 and function to correctly position the V-shaped portion against the sliding face 38a of the endless belt 38.

Air within the compartments 70 urges the V-shaped portion 82 into contact with the sliding surface of the endless belt 38. A very slight amount of air may escape around the periphery of the V-shaped portion 82 upon flexing of the endless belt member when rough terrain is traversed. This air escape is used to supply a rubber lubricant, such as a glycol, a silicon compound or the like, which is supplied through an air pressure tube 84 connected to the V-shaped portion 82 and to a constant source of air supply and lubricant (not shown).

The endless belt 38 is preferably supplied with two spaced parallel tread portions 86 and 88 which extend longitudinally around the entire length of the endless belt and a plurality of transverse track members 90 for traction purposes.

Figs. 4 to 8 indicate a vehicle construction using two pods. Each pod is mounted on a U-shaped member generally designated 92 which is pivotally mounted at its central portion on the under side of a vehicle 94. The member 92 is provided with two depending bearing arms 96 and 98 which rotatably support the drive shaft 16. The sprocket wheel 18 is provided with a chain 100 which is rotated by a sprocket wheel 102 affixed to an upper drive shaft 104 rotatably mounted in the depending bearing arms 96 and 98. The shaft 104 is provided with a bevel gear 106 which is rotated by a similar bevel 108 affixed to a vertical shaft 110. The vertical shaft is rotated from the crank shaft 112 of an engine 113 through a pair of mating bevel gears 114 and 116.

It should be realized that the drive may be the gear and chain mechanism illustrated or similar equivalent mechanism, or even directly from an electric motor mounted in the pod.

The V-shaped air seal member is advantageously a double lip type of seal which acts both to hold air within the chamber 70 as well as keep contaminants, such as mud, out. Air and lubricating material which is metered into the space 82 through passage 84 only flows to the exterior of the pod because of the internal air pressure maintained. Thus the outer lip seal is continuously cleaned and lubricated.

Each pod is supplied with compressed air through a hose connection 117 fed by a centrally located compressor 118. The compressor could include a heater 119 for heating the air in cold climates and a chiller 120 for cooling the air when the unit is exposed to high operating temperatures.

In accordance with the invention it is advantageous to provide means for heating the air supplied by the compressor in cases where the vehicle use will be in arctic regions where extremely cold temperatures are to be encountered. The fact that air which is supplied to each pod is constantly leaked around the periphery of the V-shaped member 92 permits continuous heating of the resilient member and other operating parts and prevents their failure in extreme cold conditions. Likewise, when very high temperatures are expected to be encountered, cooling means for the air fed through the hose connections 117 are advantageously supplied in order to cool the air which is supplied to each of the pods.

Since each of the pods 10 is pivoted at the center, driving and steering may be accomplished by revolving the pod about this pivot. Figs. 4 and 5 give some idea of the versatility of steering with a two pod vehicle. Of course, one, two, or more pods may be used on a vehicle depending upon the load to be carried and the maneuverability requirement. The invention provides a simply constructed traction unit having a great range of utility. A pod constructed in accordance with the invention may be used for high speeds as well as for applications requiring very large pulling force and traction. The pod requires very little servicing and is easy to maintain. It is completely adaptable for either extremes of high temperature or low temperature climatic conditions.

While a specific embodiment of the invention has been shown and described in detail to illustrate the application of the invention principles, it will be understood that the invention may be embodied otherwise without departing from such principles.

What is claimed is:

1. A ground traction device comprising spaced rollers, a resilient endless belt extending around said rollers and drivingly connected to at least one, spaced members closing a portion of the openings formed at the sides of said endless belt, and resilient air sealing members between each of said spaced members and said endless belt.

2. A ground traction device according to claim 1 wherein said resilient air sealing members includes a substantially V-shaped seal portion held in contact with said belt along the marginal edges thereof.

3. A ground traction device according to claim 2 including guiding means to maintain said V-shaped seal in contact with said belt.

4. A ground traction device according to claim 1 wherein said rollers are provided with teeth which mate with teeth affixed to said endless belt.

5. A ground traction device comprising a pair of spaced plates, a first rotatable roller mounted between said plates at one end thereof, a second rotatable roller mounted between said plates at the other end thereof, a resilient endless belt extending around each of said first and second rollers, a resilient air sealing member connected to each of said plates and maintained in air sealing contact with said endless belt, and means to maintain under pressure the area defined by said endless belt, said plates and said air sealing member, whereby to maintain said sealing member in close proximity to said belts.

6. A ground traction device according to claim 5 wherein said sealing member includes a V-shaped portion maintained in close proximity to the inner wall of said endless belt whereby to form an air seal therewith.

7. A ground traction device according to claim 5 including means to rotate said first roller.

8. A ground traction device according to claim 5 wherein said pressure maintaining means includes means to supply conditioned air under pressure.

9. A ground traction device according to claim 8 including means for heating the air supplied to said device.

10. A ground traction device according to claim 8 including means for cooling the air supplied to said device.

11. A ground vehicle comprising a body, a ground traction device pivotally connected to said body, said device including spaced side members, first and second rollers rotatably mounted between said side members, a resilient endless belt extending around said rollers, resilient air sealing members spaced between each of said side members and said endless belt, means on said body to drive one of said rollers thereby to rotate said endless belt, and means on said body to supply air under pressure to said device for maintaining the area defined by said endless belt, said side members and said resilient sealing member under pressure.

12. A vehicle according to claim 11 including means to condition the air supplied to said traction device.

13. A vehicle according to claim 12 including means connecting said resilient air sealing members to supply lubrication thereto.

14. A vehicle according to claim 5 wherein said sealing member is substantially U-shaped at its outer belt contacting periphery, and means to direct lubrication to the area defined within the U-shape thereof.

15. A ground traction device comprising spaced rollers, a resilient endless belt extending around said rollers, spaced members closing a portion of the openings formed at the sides of said endless belt, and resilient air sealing members between each of said spaced members and said endless belt, said endless belt along with said rollers being movable upon contact with the ground.

16. A ground traction device comprising spaced rollers, a resilient endless belt extending around said rollers, spaced members closing a portion of the openings formed at the sides of said endless belt, resilient air sealing members between each of said spaced members and said endless belt, and means to drive said endless belt.

References Cited in the file of this patent

UNITED STATES PATENTS

| | | |
|---|---|---|
| 2,652,290 | Bekker | Sept. 15, 1953 |
| 2,714,011 | Albee | July 26, 1955 |
| 2,734,476 | Marsh | Feb. 14, 1956 |
| 2,802,541 | Albee | Aug. 13, 1957 |
| 2,824,592 | Neisler et al. | Feb. 25, 1958 |